(12) United States Patent
Yoshida et al.

(10) Patent No.: US 12,135,255 B2
(45) Date of Patent: Nov. 5, 2024

(54) OPTICAL FIBER MEASUREMENT DEVICE AND METHOD FOR BENDING OPTICAL FIBER

(71) Applicant: Fujikura Ltd., Tokyo (JP)

(72) Inventors: Takeshi Yoshida, Suzuka (JP); Shoji Tanigawa, Sakura (JP); Akira Oshima, Sakura (JP); Ryo Omiya, Sakura (JP)

(73) Assignee: Fujikura Ltd., Tokyo (JP)

( * ) Notice: Subject to any disclaimer, the term of this patent is extended or adjusted under 35 U.S.C. 154(b) by 289 days.

(21) Appl. No.: 17/636,229

(22) PCT Filed: Sep. 1, 2020

(86) PCT No.: PCT/JP2020/032998
§ 371 (c)(1),
(2) Date: Feb. 17, 2022

(87) PCT Pub. No.: WO2021/049366
PCT Pub. Date: Mar. 18, 2021

(65) Prior Publication Data
US 2022/0334012 A1 Oct. 20, 2022

(30) Foreign Application Priority Data
Sep. 12, 2019 (JP) .................................. 2019-166336

(51) Int. Cl.
*G01L 1/24* (2006.01)
*G01M 11/08* (2006.01)

(52) U.S. Cl.
CPC ............ *G01L 1/242* (2013.01); *G01M 11/088* (2013.01)

(58) Field of Classification Search
CPC ....... G01L 1/242; G01L 5/105; G01M 11/088
See application file for complete search history.

(56) References Cited

U.S. PATENT DOCUMENTS 4,636,070 A * 1/1987 Ide ..................... G01M 11/088
356/73.1
5,458,830 A * 10/1995 Shin ..................... G01B 21/08
425/141

(Continued)

FOREIGN PATENT DOCUMENTS

CN 101321677 A 12/2008
CN 105938042 A 9/2016
(Continued)

OTHER PUBLICATIONS

International Search Report issued in corresponding International Application No. PCT/JP2020/032998, mailed on Oct. 27, 2020 (4 pages).

*Primary Examiner* — Edmond C Lau
*Assistant Examiner* — Joshua M Carlson
(74) *Attorney, Agent, or Firm* — Osha Bergman Watanabe & Burton LLP

(57) ABSTRACT

An optical fiber measurement device includes a light source, a light detector, a direction-changing member, and a tension-applying member. The light source emits light toward an optical fiber. The light detector receives the light that has propagated through the optical fiber. The optical fiber is hung on the direction-changing member. The direction-changing member changes an extending direction of the optical fiber to extend downward, the optical fiber being optically connected to the light source and the light detector at each of two end parts of the optical fiber. The tension-applying member applies a tension to the optical fiber hanging from the direction-changing member.

16 Claims, 12 Drawing Sheets

(56) References Cited

U.S. PATENT DOCUMENTS

| | | | | |
|---|---|---|---|---|
| 5,703,988 | A * | 12/1997 | Oishi | G01M 11/088 |
| | | | | 65/435 |
| 6,783,597 | B2 * | 8/2004 | Cronk | C03C 25/143 |
| | | | | 427/372.2 |
| 9,389,140 | B1 * | 7/2016 | Schildmeyer | G01M 11/088 |
| 2009/0026243 | A1 | 1/2009 | Marangoni et al. | |

FOREIGN PATENT DOCUMENTS

| | | | |
|---|---|---|---|
| JP | S61-128134 A | 6/1986 | |
| JP | H01-203938 A | 8/1989 | |
| JP | H02-050412 A | 2/1990 | |
| WO | WO-2018021954 A1 * | 2/2018 | G01B 11/18 |

* cited by examiner

OPTICAL FIBER MEASUREMENT DEVICE AND METHOD FOR BENDING OPTICAL FIBER

CROSS-REFERENCE TO RELATED APPLICATIONS

This application claims priority to Japanese Patent Application No. 2019-166336, filed Sep. 12, 2019, the contents of which are hereby incorporated herein by reference in their entirety.

TECHNICAL FIELD

The present invention relates to an optical fiber measurement device and a method for bending an optical fiber.

BACKGROUND

Patent Document 1 discloses an optical fiber measurement device including a light source, a photodetector, and a roller that bends an optical fiber. In the optical fiber measurement device, components such as the light source, the photodetector, and the roller are disposed on substantially the same plane.

CITATION LIST

Patent Document

[Patent Document 1]
   Japanese Unexamined Patent Application, First Publication No. H2-50412

SUMMARY

In the configuration of Patent Document 1, when the optical fiber is hung around the roller, the position of the optical fiber in an up-down direction is likely to vary because of the weight of the optical fiber, or the optical fiber is likely to be obliquely wound around the roller. In such a manner, when it is difficult to set the optical fiber, the posture (position) of the optical fiber with respect to the roller is likely to vary. As a result, the radius of curvature of bending of the optical fiber may vary from setting to setting, and the accuracy of measurement may become unstable.

One or more embodiments of the present invention provide an optical fiber measurement device or a method for bending an optical fiber capable of improving the ease of setting the optical fiber and of stabilizing the accuracy of measurement.

According to one or more embodiments of the present invention, there is provided an optical fiber measurement device including: a light source that emits light toward an optical fiber; a light-receiving portion (i.e., detector) that receives the light that has propagated through the optical fiber; a direction-changing member on which the optical fiber is hung, and which changes an extending direction of the optical fiber downward, the optical fiber being optically connected to the light source and the light-receiving portion at both end parts of the optical fiber; and a tension-applying member that applies a tension to the optical fiber hanging from the direction-changing member.

According to one or more embodiments of the present invention, there is provided a method for bending an optical fiber, the method including: hanging the optical fiber on a direction-changing member, both end parts of the optical fiber being fixed; applying a tension to the optical fiber hanging from the direction-changing member using a tension-applying member; and bending the optical fiber using a plurality of mandrels disposed between the direction-changing member and the tension-applying member.

According to one or more embodiments of the present invention, the optical fiber measurement device and the method for bending an optical fiber can be provided which are capable of improving the ease of setting the optical fiber and of stabilizing the accuracy of measurement.

DETAILED DESCRIPTION

First Embodiment

Hereinafter, an optical fiber measurement device and a bending method according to a first embodiment will be described with reference to the drawings.

Figure 1A:
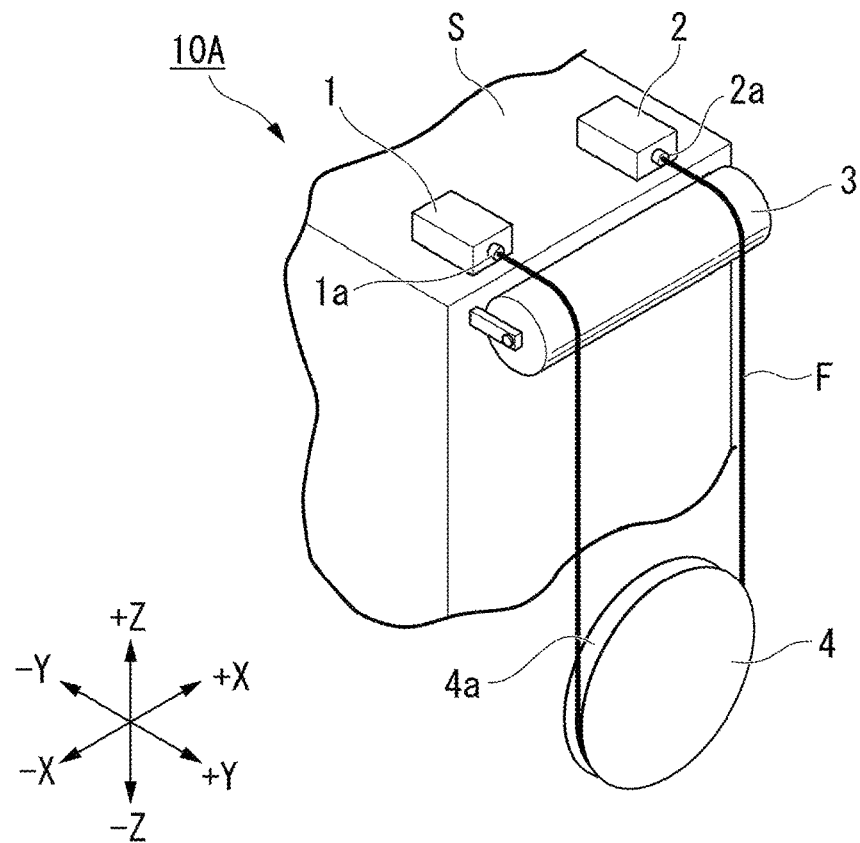
FIG. 1A is a perspective view of a measurement device according to a first embodiment.
Figure 1B:
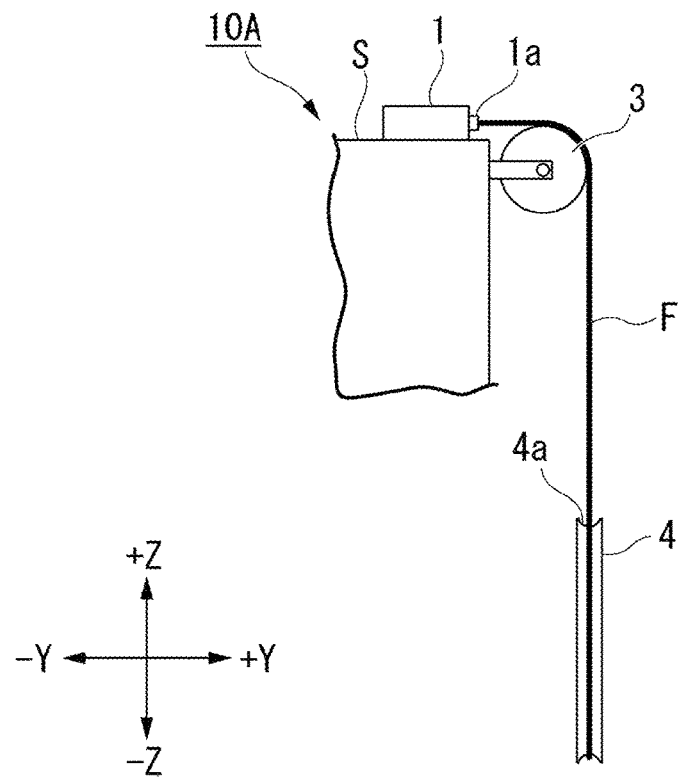
FIG. 1B is a view of the measurement device of FIG. 1A as viewed from the left.
Figure 1C:
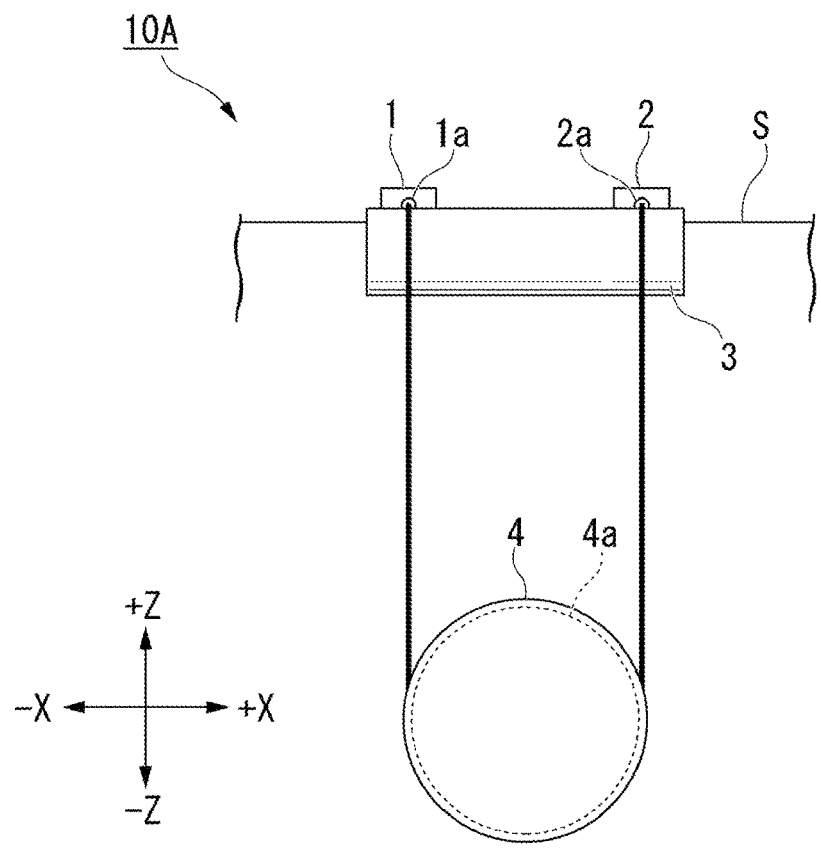
FIG. 1C is a view of the measurement device of FIG. 1A as viewed from the front.

As shown in FIGS. 1A to 1C, an optical fiber measurement device (hereinafter, referred to as a measurement device 10A) includes a stage S, a light source 1, a light-receiving portion 2, a direction-changing member 3, a tension-applying member 4, and the like. The measurement device 10A is a device that bends an optical fiber F and measures a characteristic of the optical fiber F. Incidentally, the light source 1 and the light-receiving portion 2 may be provided inside one analysis device.

(Definition of Direction)

In the present embodiment, an X-Y-Z Cartesian coordinate system is set, and a positional relationship between configurations will be described. In each drawing, a Z axis represents an up-down direction, an X axis represents one direction orthogonal to the up-down direction, and a Y axis represents a direction orthogonal to both the Z axis and the X axis. Hereinafter, a Z-axis direction is referred to as the up-down direction, an X-axis direction is referred to as a left-right direction, and a Y-axis direction is referred to as a front-back direction. In addition, a +Z side in the up-down direction indicates an upper side, and a −Z side indicates a lower side. One side (+X side) in the left-right direction is referred to as a right side, and the other side (−X side) is referred to as a left side. One side (+Y side) in the front-back direction is referred to as a front side, and the other side (−Y side) is referred to as a rear side.

The optical fiber F to be measured may be a single mode fiber. The specific type of the optical fiber F can be appropriately changed.

The stage S is a desk or the like. The light source 1 and the light-receiving portion 2 are placed on the stage S. The light source 1 and the light-receiving portion 2 are disposed at an interval in the left-right direction. The light source 1 is disposed on the left side, and the light-receiving portion 2 is disposed on the right side. Incidentally, the positions of the light source 1 and the light-receiving portion 2 may be reversed.

The light source 1 emits light toward the optical fiber F. A first end part of the optical fiber F is optically connected to an emitting side connection portion 1a of the light source 1. The wavelength of the light emitted by the light source 1 and the like are appropriately changed according to the characteristic to be measured of the optical fiber F. Namely, the light source 1 is configured to be capable of appropriately changing the wavelength of light or the like. Incidentally, the emitting side connection portion 1a and the first end part of the optical fiber F may be directly connected to each other, or may be connected to each other via another optical path (optical fiber or optical waveguide). In either case, the optical fiber F and the light source 1 are optically connected to each other.

The light-receiving portion 2 receives the light that has propagated through the optical fiber F. A second end part of the optical fiber F is optically connected to an incident side connection portion 2a of the light-receiving portion 2. The light-receiving portion 2 is configured to be capable of analyzing a characteristic of the optical fiber F based on the received light. Incidentally, the incident side connection portion 2a and the second end part of the optical fiber F may be directly connected to each other, or may be connected to each other via another optical path (optical fiber or optical waveguide). In either case, the optical fiber F and the light-receiving portion 2 are optically connected to each other.

The direction-changing member 3 is located in front of the light source 1 and the light-receiving portion 2. A part of the optical fiber F connected to the light source 1 and the light-receiving portion 2 is hung on the direction-changing member 3. Accordingly, the direction-changing member 3 changes a direction, in which the optical fiber F extends forward from the light source 1 and the light-receiving portion 2, downward. The direction-changing member 3 extends along the left-right direction. A left end portion of the direction-changing member 3 is located on a left side of the emitting side connection portion 1a, and a right end portion of the direction-changing member 3 is located on a right side of the incident side connection portion 2a. Namely, the direction-changing member 3 is disposed across the emitting side connection portion 1a and the incident side connection portion 2a in the left-right direction. The direction-changing member 3 is fixed to the stage S. However, the direction-changing member 3 may be fixed to a member other than the stage S (for example, floor surface or the like).

The direction-changing member 3 of the present embodiment is formed in a columnar shape. In addition, a diameter of the column is smaller than φ280 mm, and a part of the optical fiber F is bent along an outer peripheral surface of the direction-changing member 3. For this reason, the optical fiber F is bent at a radius of curvature smaller than 140 mm by the direction-changing member 3. Generally, bending at a radius of curvature of 140 mm or more is not regarded as bending when a characteristic of the optical fiber F is measured. The reason is that such bending at a small curvature is unlikely to affect the characteristic of the optical fiber F. Conversely, the direction-changing member 3 of the present embodiment intentionally bends the optical fiber F to a size to be considered when a characteristic of the optical fiber F is measured.

The tension-applying member 4 is located below the direction-changing member 3. As shown in FIG. 1B, the position of the tension-applying member 4 in the front-back direction coincides with the position of a front end portion of the direction-changing member 3. The tension-applying member 4 is configured to be movable in the up-down direction with respect to the stage S and the direction-changing member 3. When the optical fiber F is measured, the tension-applying member 4 is suspended by the optical fiber F hanging downward from the direction-changing member 3. The tension-applying member 4 applies a tension to the optical fiber F by means of, for example, its weight. The tension can be appropriately changed, but may be, for example, 20 gf or less.

The tension-applying member 4 is formed in a substantially disk shape. As shown in FIG. 1B, a groove 4a is formed in a central portion of the tension-applying member 4 in the front-back direction. The optical fiber F passes through the inside of the groove 4a. The position of the optical fiber F is regulated by the groove 4a, so that the posture of the optical fiber F is stable, and the optical fiber F can be prevented from coming off from the tension-applying member 4.

A diameter of a bottom surface of the groove 4a shown in FIG. 1C is smaller than φ280 mm, and a part of the optical fiber F is bent along the bottom surface of the groove 4a. For this reason, the optical fiber F is bent at a radius of curvature smaller than 140 mm by the tension-applying member 4. Namely, similarly to the direction-changing member 3, the tension-applying member 4 also bends the optical fiber F to a size to be considered when a characteristic of the optical fiber F is measured. Incidentally, the tension-applying member 4 may not include the groove 4a. In this case, the radius of an outer peripheral surface of the tension-applying member 4 is set to coincide with the desired radius of curvature of the optical fiber F.

In the present embodiment, a tension is applied to the optical fiber F only by the weight of the tension-applying member 4 having a disk shape. However, the configuration for applying a tension, the shape of the tension-applying member 4, and the like can be appropriately changed.

Figure 1D:
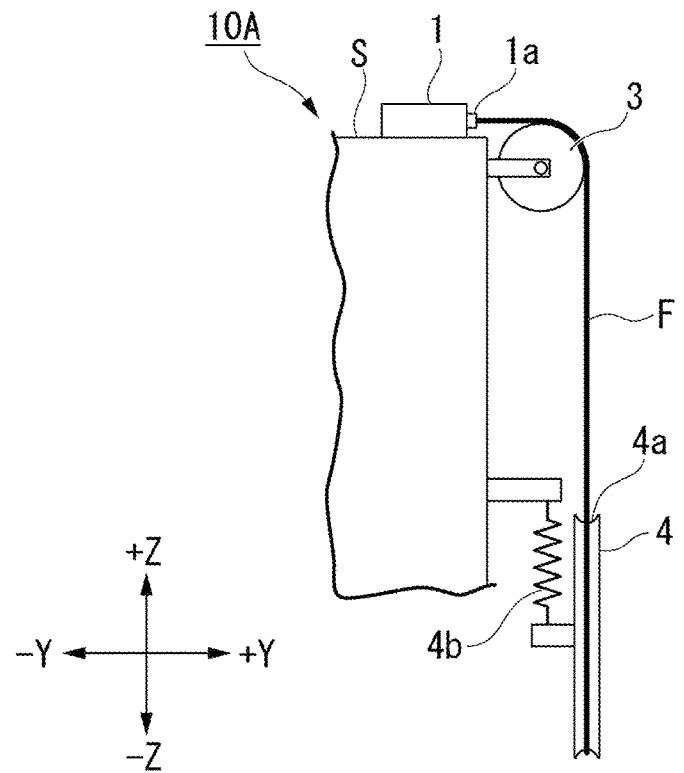
FIG. 1D is a view of a measurement device according to a modification example of the first embodiment as viewed from the left.

For example, as shown in FIG. 1D, a spring 4b may be provided so as to apply an upward force to the tension-applying member 4. In this case, a difference obtained by subtracting an elastic force of the spring 4b from the weight of the tension-applying member 4 is a tension of the optical fiber F. Further, a so-called constant load spring may be used as the spring 4b. The constant load spring is a spring of which the load does not change according to the amount of deformation. When a constant load spring is used, the tension of the optical fiber F can be made constant regardless of the position of the tension-applying member 4 in the up-down direction.

Figure 1E:
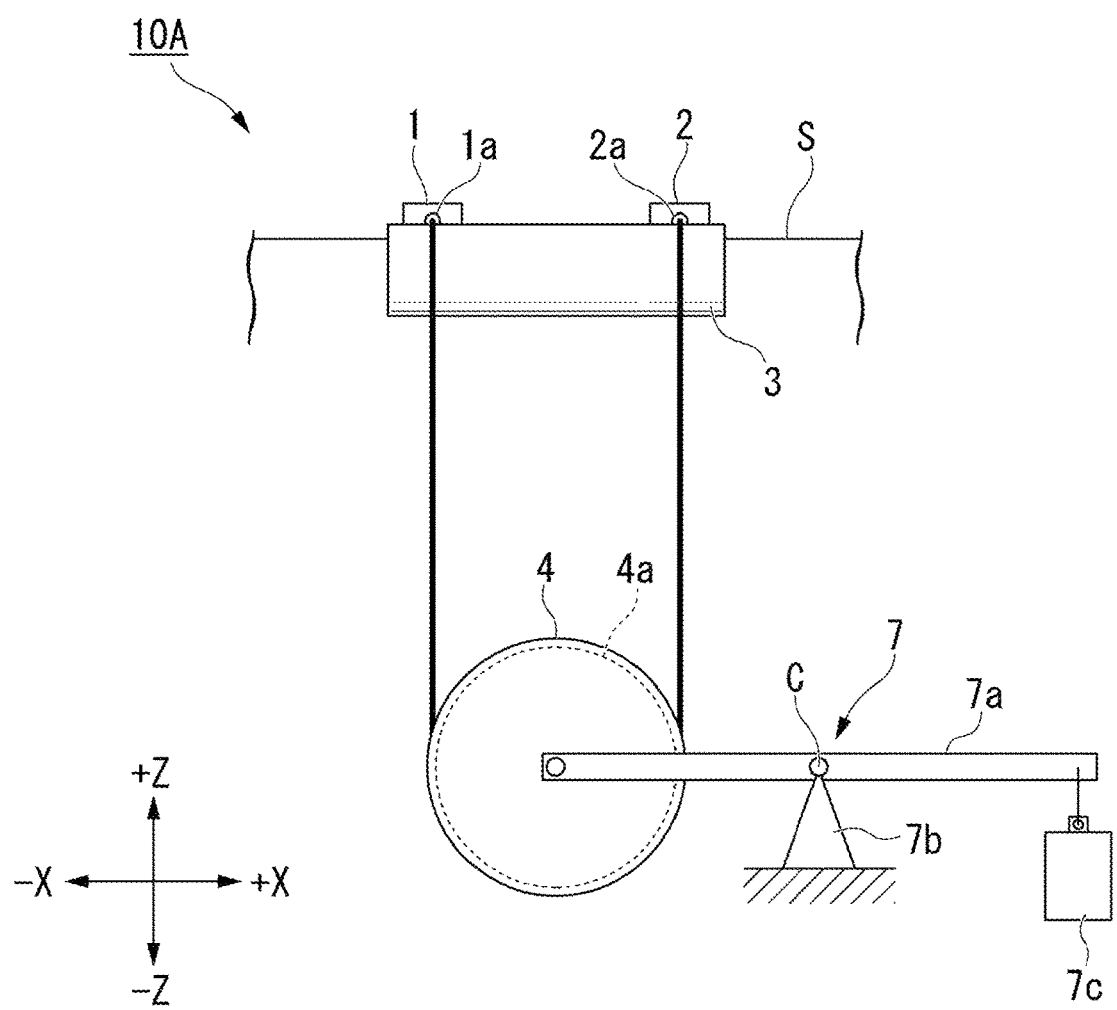
FIG. 1E is a view of a measurement device according to another modification example of the first embodiment as viewed from the front.

In addition, a balance structure 7 as shown in FIG. 1E may be adopted. The balance structure 7 includes a balance pole 7a, a support portion 7b, and a weight 7c. The balance pole 7a is supported by the support portion 7b so as to be rotatable around a fulcrum C. A first end portion of the balance pole 7a is rotatably fixed to the tension-applying member 4, and the weight 7c is attached to a second end portion of the balance pole 7a. According to this configuration, a difference obtained by subtracting an upward force from the weight of the tension-applying member 4 is a tension of the optical fiber F, the upward force being applied to the tension-applying member 4 by the weight 7c.

According to the configuration of FIG. 1D, the tension of the optical fiber F can be easily changed by changing the strength of the spring 4b. In addition, when a load sensor is provided which detects a load applied to the spring 4b, a tension applied to the optical fiber F can be monitored.

According to the configuration of FIG. 1E, the tension of the optical fiber F can be easily changed by changing the position or the mass of the weight 7c. In addition, when a load sensor is provided below the weight 7c or a torque sensor is provided which detects a torque around the fulcrum C, a tension applied to the optical fiber F can be monitored.

In addition, a tension applied to the optical fiber F can also be changed by attaching or removing a weight to or from the tension-applying member 4 itself.

Alternatively, the weight of the tension-applying member 4 can be changed and a tension applied to the optical fiber F can be changed by changing the shape of the tension-applying member 4, such as forming the tension-applying member 4 in a semi-circular shape.

Next, a method for bending the optical fiber F in the present embodiment will be described.

First, the optical fiber F to be measured is cut to a predetermined length.

Next, both end parts of the optical fiber F are connected to the emitting side connection portion 1a of the light source 1 and the incident side connection portion 2a of the light-receiving portion 2. At this time, both end parts of the optical fiber F are fixed to the emitting side connection portion 1a and the incident side connection portion 2a such that the optical fiber F is not pulled out from the emitting side connection portion 1a and the incident side connection portion 2a by a tension applied by the tension-applying member 4.

Next, the optical fiber F of which both end parts are connected to the light source 1 and the light-receiving portion 2 is hung on the direction-changing member 3 from above, and hangs downward because of its weight. Accordingly, the direction in which the optical fiber F extends forward from the light source 1 and the light-receiving portion 2 toward the direction-changing member 3 is changed downward.

Next, the tension-applying member 4 is brought closer to the optical fiber F from above, the optical fiber F hanging from the direction-changing member 3. In the present embodiment, since the tension-applying member 4 includes the groove 4a, the optical fiber F is inserted into the groove 4a. A predetermined tension is applied to the optical fiber F by the tension-applying member 4, and the optical fiber F is bent along the direction-changing member 3 and the tension-applying member 4.

Next, light for measurement is emitted from the light source 1. The light is incident on the light-receiving portion 2 through the optical fiber F. When the light passes through parts of the optical fiber F which are bent by the direction-changing member 3 and the tension-applying member 4, the intensity of the light or the like changes. Therefore, the characteristic of the optical fiber F related to bending can be evaluated by analyzing the light incident on the light-receiving portion 2.

As described above, the measurement device 10A of the present embodiment includes: the light source 1 that emits light toward the optical fiber F; the light-receiving portion 2 that receives the light that has propagated through the optical fiber F; the direction-changing member 3 on which the optical fiber F is hung, and which changes an extending direction of the optical fiber F downward, the optical fiber F being optically connected to the light source 1 and the light-receiving portion 2 at both end parts of the optical fiber F; and the tension-applying member 4 that applies a tension to the optical fiber F hanging from the direction-changing member 3.

According to this configuration, in the up-down direction, the positions of parts where the optical fiber F contacts with and is bent by the direction-changing member 3 and the tension-applying member 4 are unlikely to vary because of the weight of the optical fiber F or the like. For this reason, the optical fiber F is easily set. Therefore, the radius of curvature of bending of the optical fiber or the like is stable, so that the accuracy of measurement can be stabilized.

In addition, the groove 4a that regulates the position of the optical fiber F is formed in the tension-applying member 4. Accordingly, the ease of setting the optical fiber F on the tension-applying member 4 is more improved. In addition, since the shape of a part of the optical fiber F which is bent along the tension-applying member 4 is stable, the accuracy of measurement can be more stabilized.

Second Embodiment

Next, a second embodiment according to the present invention will be described, but a basic configuration is the same as that in the first embodiment. For this reason, the same configurations are denoted by the same reference signs, a description thereof will be omitted, and only different points will be described.

Figure 2A:
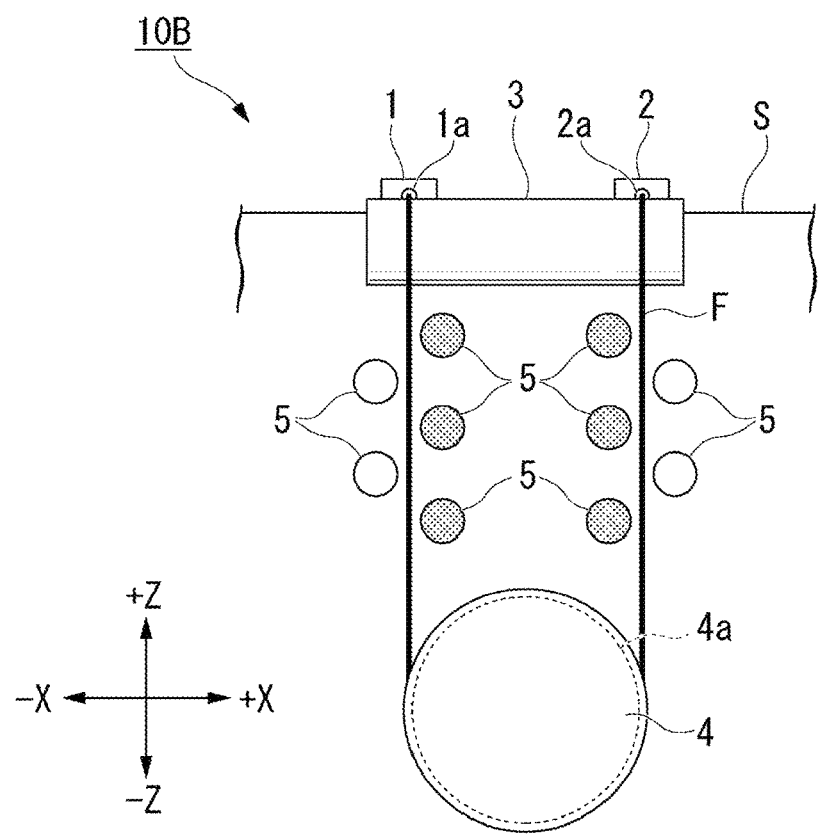
FIG. 2A is a view of a measurement device according to a second embodiment as viewed from the front.
Figure 2B:
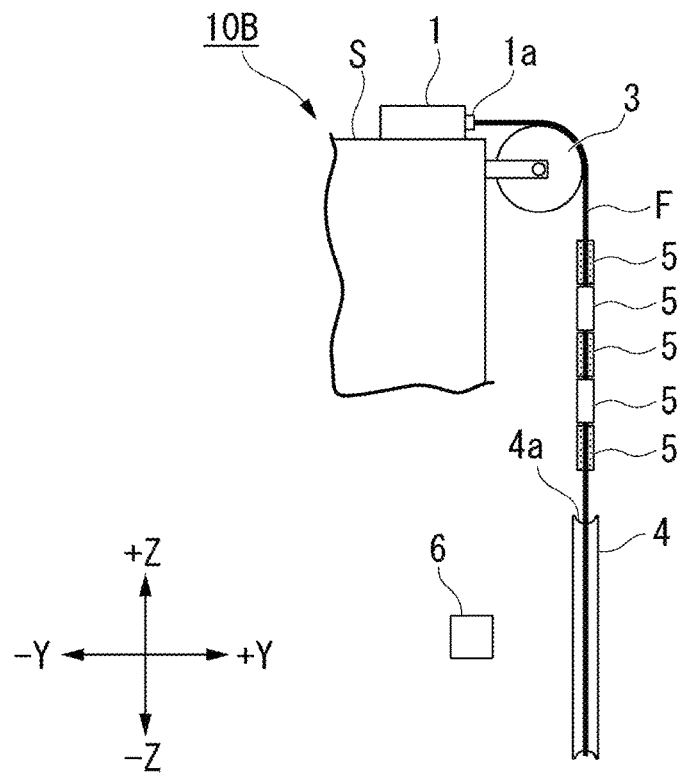
FIG. 2B is a view of the measurement device of FIG. 2A as viewed from the left.

As shown in FIGS. 2A and 2B, a measurement device 10B of the present embodiment includes a plurality of mandrels 5 and a position detection unit (i.e., position detector) 6 in addition to the stage S, the light source 1, the light-receiving portion 2, the direction-changing member 3, the tension-applying member 4.

The position detection unit 6 shown in FIG. 2B is configured to detect the position of the tension-applying member 4 in the up-down direction.

The plurality of mandrels 5 are disposed between the direction-changing member 3 and the tension-applying member 4. The plurality of mandrels 5 are configured to bend the optical fiber F. As shown in FIG. 2A, in part of the optical fiber F located on a left side of the tension-applying member 4, some mandrels 5 are disposed to interpose the part of the optical fiber F therebetween in the left-right direction. In addition, in part of the optical fiber F located on a right side of the tension-applying member 4, the remaining mandrels 5 are disposed to interpose the part of the optical fiber F therebetween in the left-right direction. In addition, the same number of the mandrels 5 may be disposed on the right side and the left side of the tension-applying member 4. Further, the positions of the mandrels 5 disposed on the left side of the tension-applying member 4 and the positions of the mandrels 5 disposed on the right side of the tension-applying member 4 in the up-down direction may coincide with each other.

In addition, at least one mandrel 5 disposed on the left side of the tension-applying member 4 and at least one mandrel 5 disposed on the right side of the tension-applying member in the left-right direction may be provided.

When the plurality of mandrels 5 are disposed in such a manner, a pass line of the optical fiber F can be compactly arranged. Namely, it is possible to shorten the dimension of the optical fiber measurement device in the up-down direction.

As shown in FIG. 2B, the position of each of the mandrels 5 in the front-back direction coincides with the position of the tension-applying member 4 in the front-back direction. In the example of FIG. 2A, the diameter of each of the mandrels 5 is smaller than the diameter of the tension-applying member 4. However, the diameter of each of the mandrels 5 may be the same as the diameter of the tension-applying member 4, or may be larger than the diameter of the tension-applying member 4. In other words, the bending (diameter) of each part can be appropriately set according to the characteristic that is desired to be measured.

Figure 3A:
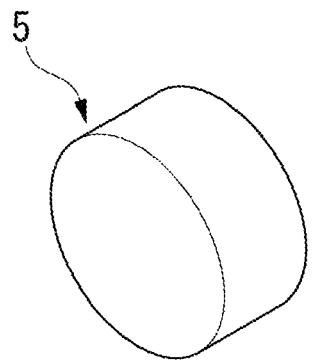
FIG. 3A is a view showing a first example of a shape of a mandrel.
Figure 3B:
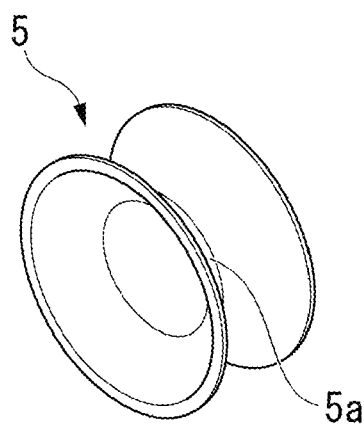
FIG. 3B is a view showing a second example of a shape of a mandrel.
Figure 3C:
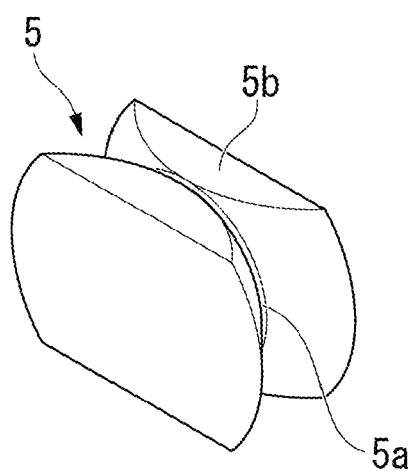
FIG. 3C is a view showing a third example of a shape of a mandrel.

FIGS. 3A to 3C each show one example of a shape of the mandrel 5.

As shown in FIG. 3A, the mandrel 5 may have a columnar shape (disk shape) without a groove. When the mandrel 5 of FIG. 3A is used, the optical fiber F is bent along an outer peripheral surface of the mandrel 5. In this case, a radius of the outer peripheral surface of the mandrel 5 is set to coincide with a desired radius of curvature of the optical fiber F. In this case, a diameter of the outer peripheral surface of the mandrel 5 is smaller than $\varphi 280$ mm.

As shown in FIG. 3B or 3C, the mandrel 5 may include a groove (mandrel groove) 5a. When the mandrel 5 of FIG. 3B or FIG. 3C is used, the optical fiber F is bent along a bottom surface of the groove 5a. In this case, a radius of the bottom surface of the groove 5a is set to coincide with a desired radius of curvature of the optical fiber F. In this case, the diameter of the bottom surface of the groove 5a is smaller than $\varphi 280$ mm.

In addition, when both the mandrel 5 and the tension-applying member 4 include a groove, the position of the groove 5a of the mandrel 5 in the front-back direction and the position of the groove 4a of the tension-applying member 4 in the front-back direction coincide with each other. Accordingly, parts of the optical fiber F which are in contact with the mandrel 5 and the tension-applying member 4 are prevented from being unnecessarily bent in the front-back direction. In addition, the grooves of both the mandrel 5 and the tension-applying member 4 can prevent a pass line of the optical fiber F from being misaligned in the front-back direction.

As shown in FIG. 3C, the mandrel 5 may include a cutout portion 5b. When the mandrels 5 of FIG. 3C are used, the mandrels 5 can be prevented from coming into contact with each other. Incidentally, the shape of the mandrel 5 is not limited to those of FIGS. 3A to 3C, and can be appropriately changed. For example, the cutout portion 5b as shown in FIG. 3C may be formed in the mandrel 5 of FIG. 3A.

In addition, a combination of the mandrels 5 shown in FIGS. 3A to 3C may be used as the plurality of mandrels 5 provided in the measurement device 10B.

Next, a method for bending the optical fiber F in the present embodiment will be described.

First, similarly to the first embodiment, the optical fiber F of which both end parts are connected to the light source 1 and the light-receiving portion 2 is hung on the direction-changing member 3 and hangs downward. In addition, a tension is applied to the optical fiber F by the tension-applying member 4. The loosening of the optical fiber F is removed by application of the tension.

Figure 4A:
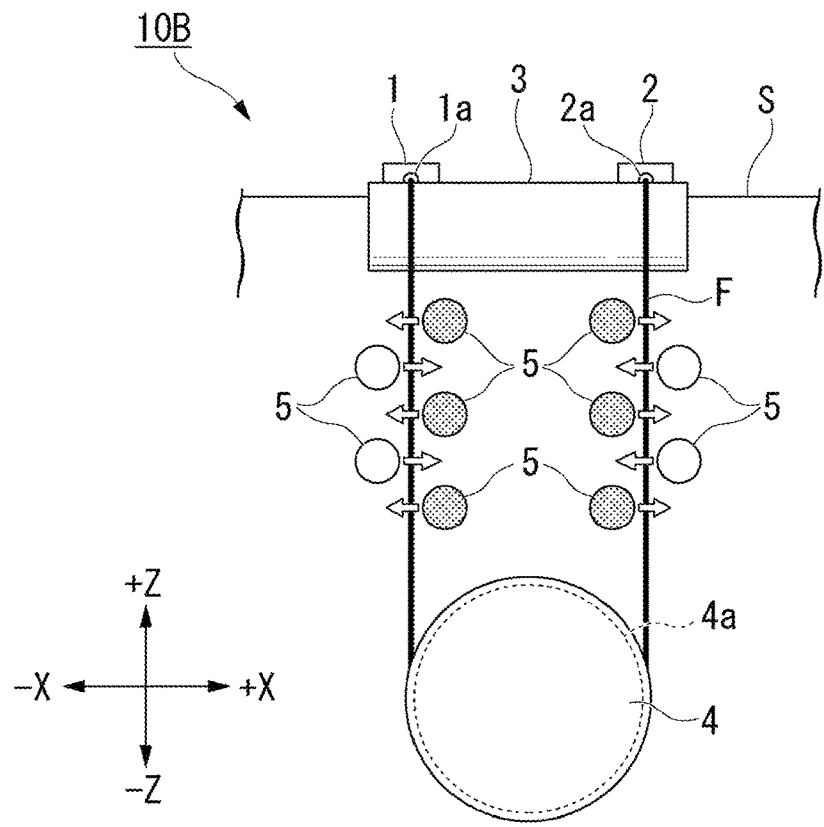
FIG. 4A is a view showing a movement direction of each mandrel in the measurement device of FIG. 2A.

Next, as shown in FIG. 4A, the mandrels 5 are moved to interpose the optical fiber F therebetween. In FIG. 4A, each of the mandrels 5 is moved in the left-right direction, but a movement direction of the mandrel 5 may be appropriately changed. When the mandrel 5 includes the groove 5a, the optical fiber F enters the inside of the groove 5a.

Figure 4B:
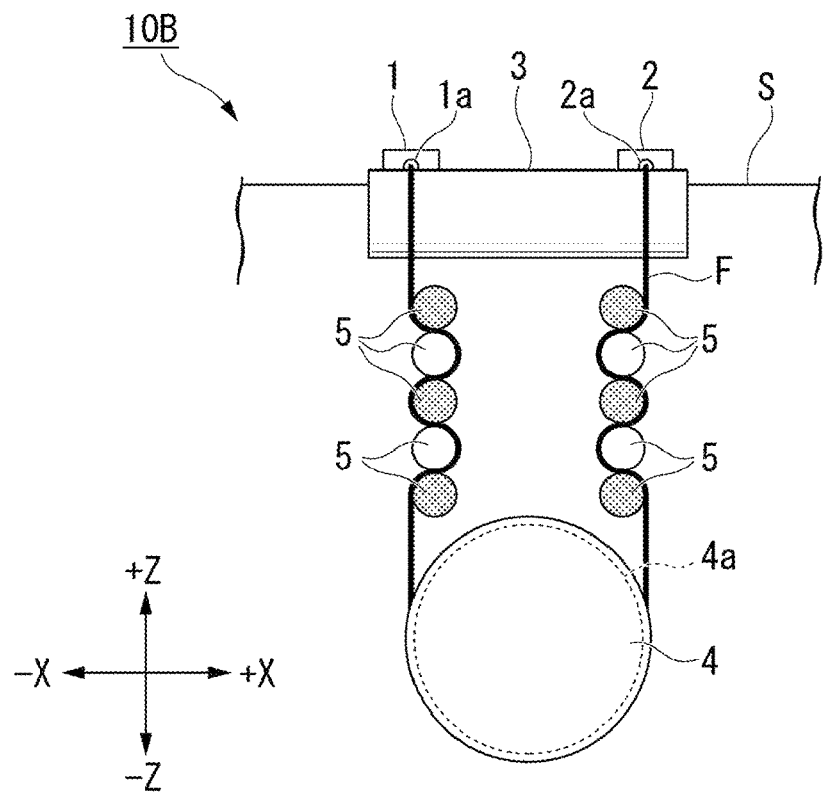
FIG. 4B is a view after each mandrel has been moved in the measurement device of FIG. 4A.

As shown in FIG. 4B, the mandrels 5 are moved, so that the optical fiber F is bent along each of the mandrels 5. Accordingly, the optical fiber F is bent at a desired radius of curvature based on the radius of the outer peripheral surface of the mandrel 5 or of the bottom surface of the groove 5a.

In the example of FIG. 4B, among five mandrels 5 disposed on the left side of the tension-applying member 4, the optical fiber F is bent at a degree of 90° along the upper mandrel 5 and the lower mandrel 5. In addition, the optical fiber F is bent at an angle of 180° along each of three mandrels 5 disposed between the upper mandrel 5 and the lower mandrel 5. Similarly, the optical fiber F is also bent by five mandrels 5 disposed on the right side of the tension-applying member 4.

In such a manner, the mandrels 5 that bend the optical fiber F at an angle of 90° and the mandrels 5 that bend the optical fiber F at an angle of 180° are combined, so that the optical fiber F can be bent at a desired angle. Accordingly, the angle of bending of the optical fiber F can be easily adjusted. In addition, a path (pass line) of the optical fiber F from the light source 1 to the light-receiving portion 2 is easily designed.

Incidentally, the angle of bending of the optical fiber F may be adjusted by either of the mandrels 5 that bend the optical fiber F at an angle of 90° and the mandrels 5 that bend the optical fiber F at an angle of 180°.

Since the mandrels 5 are in contact with the optical fiber F in a state where the optical fiber F is tensioned by the tension-applying member 4, loosening or twisting of the optical fiber F can be prevented from remaining in the optical fiber F.

Light is emitted from the light source 1 in this state, and the light is analyzed in the light-receiving portion 2, so that the characteristic of the optical fiber F related to bending can be measured.

Figure 4C:
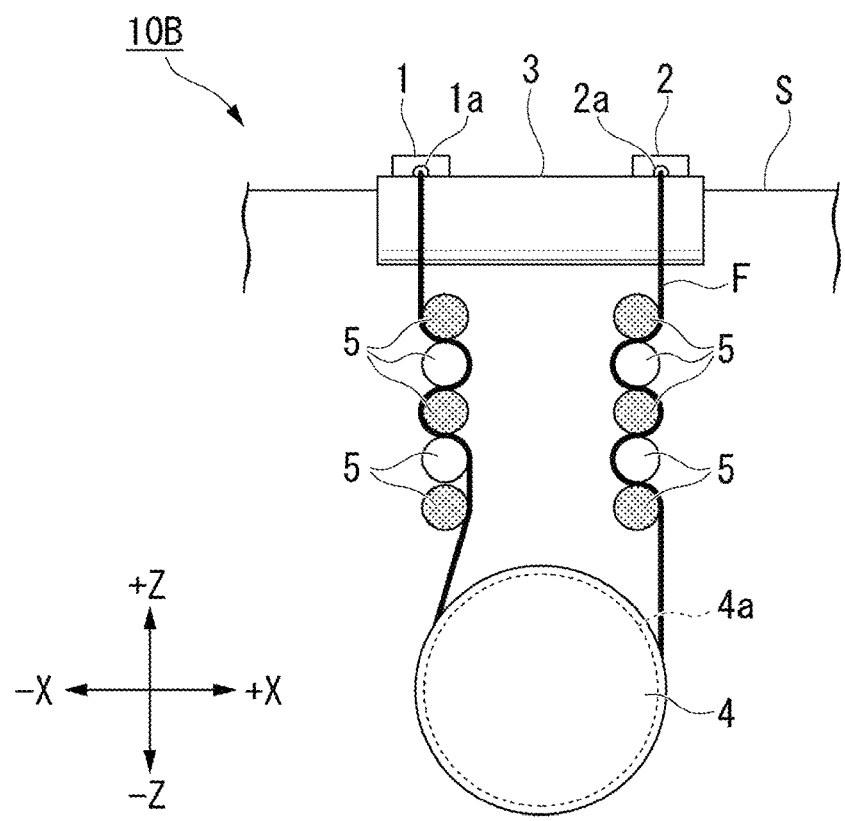
FIG. 4C is a view showing a case where an optical fiber is not properly wound around the mandrels in the measurement device of FIG. 4A.

Here, for example, as shown in FIG. 4C, when the optical fiber F is not properly hung around some mandrels 5, the tension-applying member 4 is located below a predetermined position. Therefore, the position of the tension-applying member 4 is detected by the position detection unit 6, so that it can be determined whether or not the optical fiber F is properly hung around all the mandrels 5.

Figure 5A:
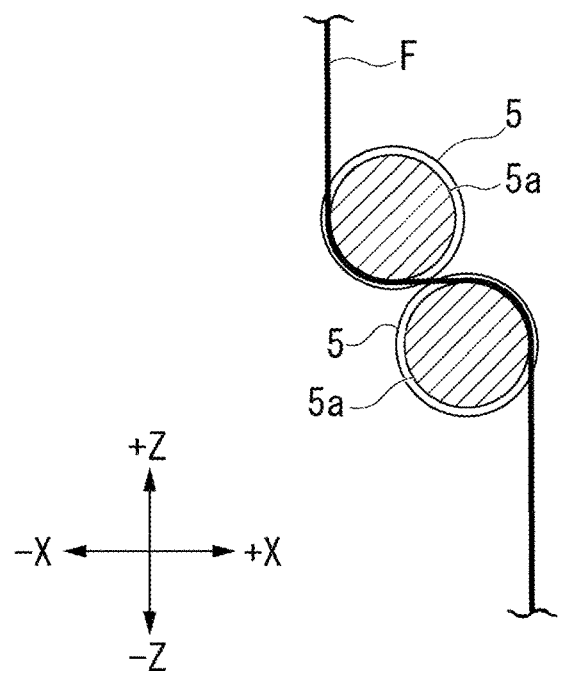
FIG. 5A is a view showing a modification example of disposition of mandrels.
Figure 5B:
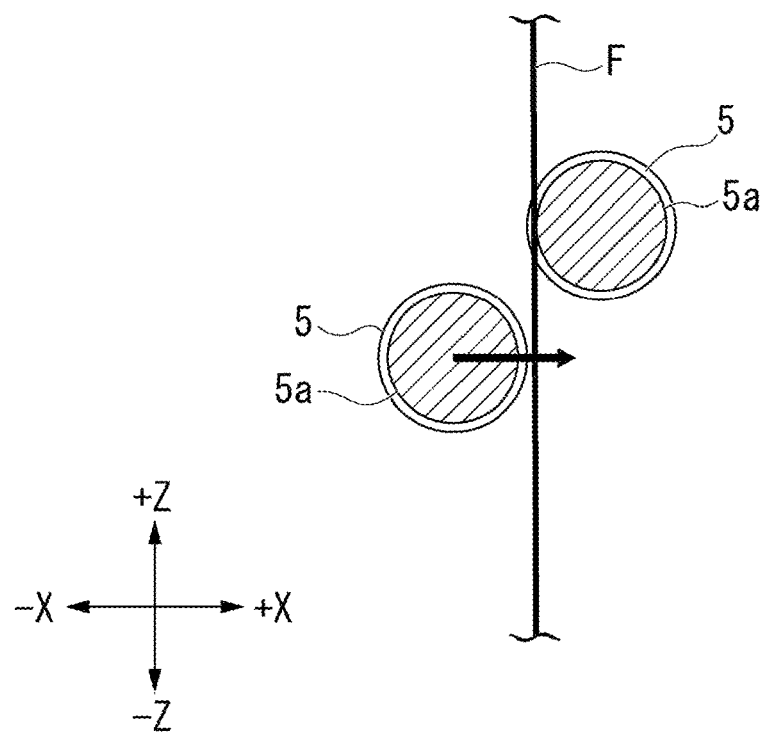
FIG. 5B is a view showing a case where a mandrel is moved parallel to a left-right direction.
Figure 5C:
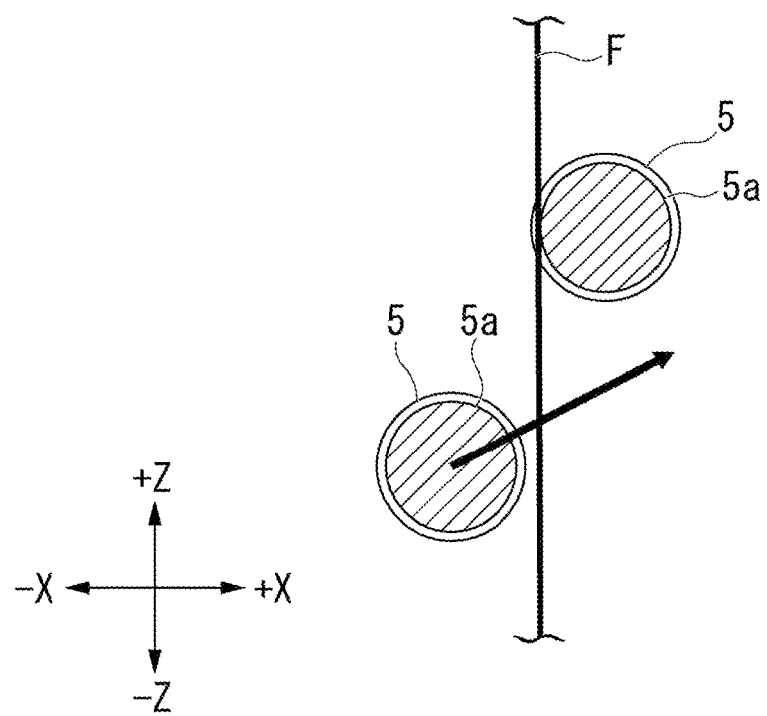
FIG. 5C is a view showing a case where a mandrel is moved obliquely with respect to the left-right direction.

In addition, the disposition of the mandrels 5 can be appropriately changed, and for example, disposition as shown in FIG. 5A may be adopted. Here, when the lower mandrel 5 is moved parallel to the left-right direction as shown in FIG. 5B in order to obtain the state shown in FIG. 5A, the mandrels 5 may come into contact with each other. Such a situation is likely to occur particularly when the groove 5a is formed in the mandrels 5. Therefore, as shown in FIG. 5C, an oblique movement of the mandrel 5 with respect to the left-right direction can prevent the mandrels 5 from coming into contact with each other. In the example of FIG. 5C, as viewed from the front, the lower mandrel 5 is inclined and moved in a +Z-axis direction with respect to the left-right direction.

As described above, the measurement device 10B of the present embodiment includes the plurality of mandrels 5 that bend the optical fiber F. Accordingly, the optical fiber F can be bent to a greater extent.

Incidentally, in the case of the present embodiment, since the optical fiber F can be bent by the mandrels 5, it is not essential to apply bending to be measured to the optical fiber F by the direction-changing member 3 and the tension-applying member 4. Namely, in the present embodiment, the diameter of the outer peripheral surface of the direction-changing member 3, of the outer peripheral surface of the tension-applying member 4, or of the bottom surface of the groove 4a may be larger than φ280 mm.

In addition, the groove (mandrel groove) 5a that regulates the position of the optical fiber F may be formed in at least one of the plurality of mandrels 5. In this case, the position of the optical fiber F bent by the mandrel 5 including the groove 5a can be more stabilized. Therefore, the accuracy of measurement can be more stabilized.

In addition, the positions of the groove 4a and the mandrel groove 5a in the front-back direction may coincide with each other, where the front-back direction is a direction orthogonal to both the up-down direction and the left-right direction in which the plurality of mandrels 5 face each other with the optical fiber F interposed therebetween as viewed in the up-down direction. Accordingly, parts of the optical fiber F which are in contact with the mandrel 5 and the tension-applying member 4 are prevented from being unnecessarily bent in the front-back direction. In addition, the grooves of both the mandrel 5 and the tension-applying member 4 can prevent a pass line of the optical fiber F from being misaligned in the front-back direction.

In addition, at least one of the plurality of mandrels 5 may be movable obliquely with respect to the left-right direction in which the plurality of mandrels 5 face each other with the optical fiber interposed therebetween as viewed in the up-down direction. In this case, the mandrels 5 can be prevented from coming into contact with each other.

In addition, the measurement device 10B of the present embodiment includes the position detection unit 6 that detects the position of the tension-applying member 4 in the up-down direction. With this configuration, it is possible to determine whether or not the optical fiber F is properly hung around the mandrels 5. Therefore, it is possible to prevent in advance from being measured under an erroneous bending condition when measuring the characteristic of the optical fiber F.

In addition, the plurality of mandrels 5 may include at least one mandrel 5 disposed on the left side of the tension-applying member 4 in the left-right direction and at least one mandrel 5 disposed on the right side of the tension-applying member 4 in the left-right direction. Accordingly, the pass line of the optical fiber F can be compactly arranged, and the dimension of the optical fiber measurement device in the up-down direction can be shortened.

In addition, the plurality of mandrels 5 may include the mandrels 5 that bend the optical fiber F at an angle of 90° and the mandrels 5 that bend the optical fiber F at an angle of 180°. Since the plurality of mandrels 5 are combined in such a manner, the optical fiber F can be bent at a desired angle and thus, the angle of bending of the optical fiber F can be easily adjusted. In addition, a path (pass line) of the optical fiber F from the light source 1 to the light-receiving portion 2 is easily designed.

In addition, the method for bending an optical fiber according to the present embodiment includes: hanging the optical fiber F on the direction-changing member 3, both end parts of the optical fiber being fixed; applying a tension to the optical fiber F hanging from the direction-changing member 3 using the tension-applying member 4; and bending the optical fiber F using the plurality of mandrels 5 disposed between the direction-changing member 3 and the tension-applying member 4. According to this configuration, in the up-down direction, the positions of parts where the optical fiber F contacts with and is bent by the direction-changing member 3 and the tension-applying member 4 are unlikely to vary. Further, since the mandrels 5 come into contact with the optical fiber F to which a tension is applied in advance by the tension-applying member 4, loosening or twisting of the optical fiber F can be prevented from remaining in the optical fiber F in contact with the mandrels 5. Therefore, the ease of setting the optical fiber F can be improved, and the accuracy of measurement can be more stabilized.

EXAMPLES

Hereinafter, the above embodiments will be described with reference to specific examples. Incidentally, the present invention is not limited to the following examples.

(Bending Loss Measurement)

Figure 6A:
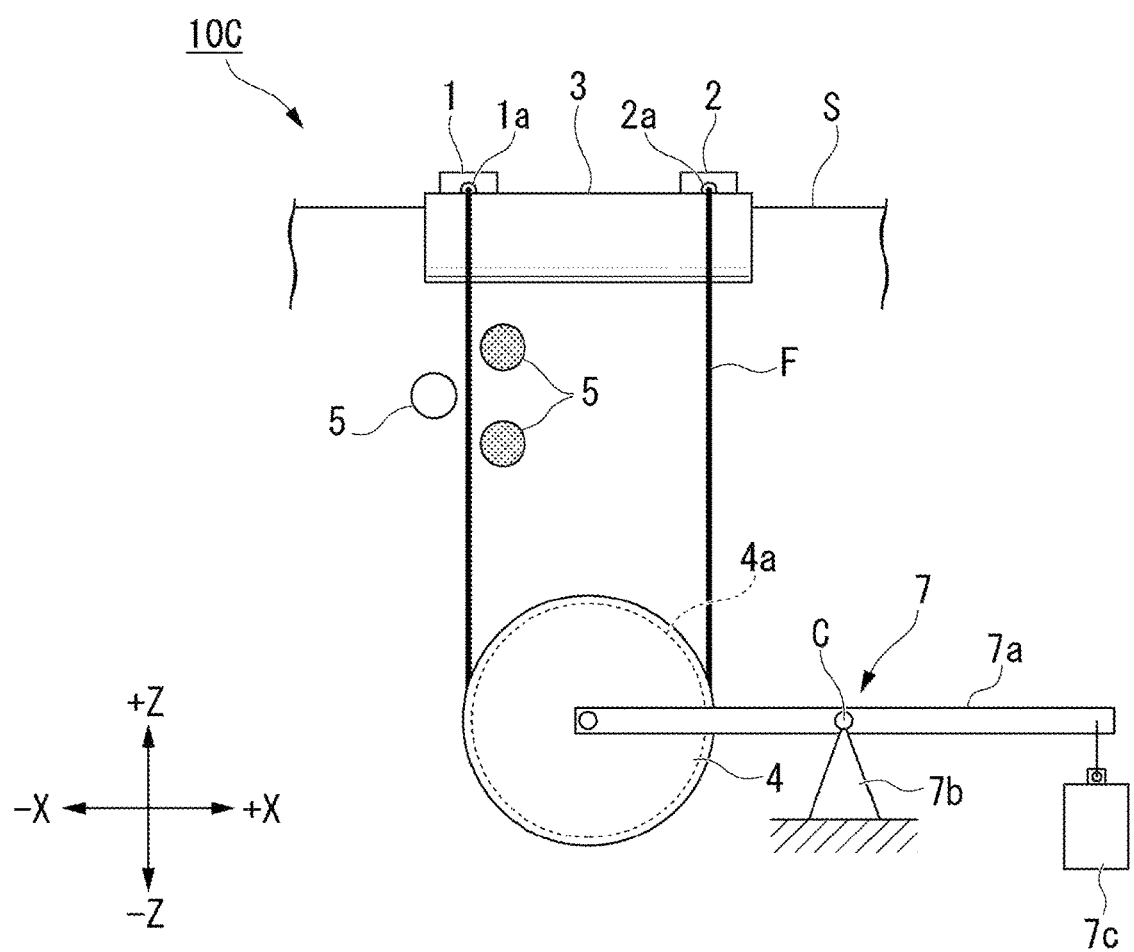
FIG. 6A is a view of a measurement device according to an example as viewed from the front.

A measurement device 10C as shown in FIG. 6A was prepared. The measurement device 10C included the light source 1, the light-receiving portion 2, the direction-changing member 3, the tension-applying member 4, three mandrels 5, the position detection unit 6 (not shown), and the balance structure 7. A diameter of an outer peripheral surface of each of the three mandrels 5 was set to φ20 mm. The tension-applying member 4 included the groove 4a, and the diameter of the bottom surface of the groove 4a was φ280 mm. In the measurement device 10C, bending to be measured was applied to the optical fiber F by the three mandrels 5. The bending of the optical fiber F by the tension-applying member 4 was not a measurement target since the radius of curvature is 140 mm. In addition, since the diameter of the direction-changing member 3 was also φ280 mm or more, the bending of the optical fiber F by the direction-changing member 3 was not a measurement target.

Figure 6B:
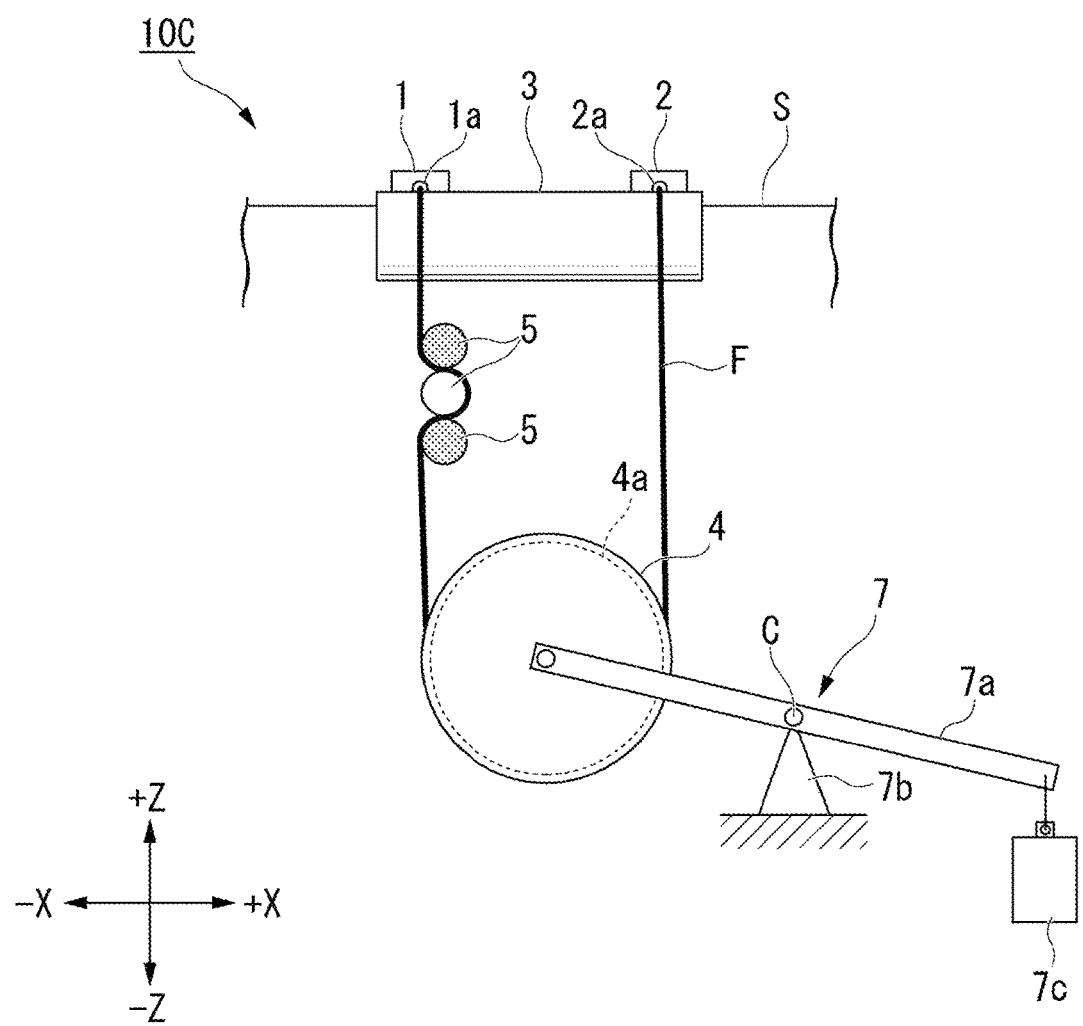
FIG. 6B is a view after a mandrel has been moved in the measurement device of FIG. 6A.

As shown in FIG. 6A, the optical fiber F was set in the measurement device 10C, and then the mandrels 5 were moved to be in the state shown in FIG. 6B. As shown in FIG. 6B, the optical fiber F was bent at an angle of 90° by each of the upper and lower mandrels 5. In addition, the optical fiber F was bent at an angle of 180° by the central mandrel 5. Therefore, the optical fiber F was bent at a radius of curvature equivalent to 10 mm×360° using the measurement device 10C. This bending condition was the same as that in the case where the optical fiber F was wound one wrap around a cylinder having a diameter of φ20 mm.

As shown in Table 1, the tension applied to the optical fiber F by the tension-applying member 4 was changed in a range of 1 gf to 20 gf. The tension was adjusted by changing the position and the weight of the weight 7c. φ shown in Table 1 represents the magnitude (standard deviation) of measurement variations under each condition. Hereinafter, a more detailed description will be provided.

cylinder in a twisted state, or the optical fiber F is likely to be wound obliquely with respect to an axial direction of the cylinder.

In such a manner, when the posture of winding around the cylinder varies, the radius of curvature of bending of the optical fiber F also varies. Therefore, in Comparative Example 1, it is considered that a variation of Δ is large and the value of φ is also large.

TABLE 1

|  | Comparative Example 1 | Example 1-1 | Example 1-2 | Example 1-3 | Example 1-4 | Example 1-5 | Example 1-6 | Example 1-7 |
|---|---|---|---|---|---|---|---|---|
| Bending method | Manual work | Measurement device 10C | Measurement device 10C | Measurement device 10C | Measurement device 10C | Measurement device 10C | Measurement device 10C | Measurement device 10C |
| Tension | — | 20 gf | 15 gf | 10 gf | 5 gf | 3 gf | 2 gf | 1 gf |
| σ | 1.52 dB | 0.56 dB | 0.48 dB | 0.39 dB | 0.47 dB | 0.33 dB | 0.42 dB | 0.45 dB |

In Comparative Example 1, the optical fiber F in a linear state was connected to the light source 1 and the light-receiving portion 2, and a transmitted power P1 was measured by the light-receiving portion 2. The measurement wavelength was set to 1,625 nm. Thereafter, the optical fiber F was manually wound one wrap around a cylinder having a diameter of φ20 mm, light was emitted from the light source 1 in this state, and a transmitted power P2 was measured by the light-receiving portion 2. In Comparative Example 1, there is no tension data due to manual winding, but it is considered that the tension is approximately 10 gf. A value Δ of a loss caused by winding the optical fiber F around the mandrel can be calculated by the following mathematical formula (1).

$$\Delta = 10 \, \text{Log}(P1/P2) \quad (1)$$

When this measurement was performed 10 times and a standard deviation of the values of Δ was calculated, φ=1.52 dB.

In Example 1-1, a tension of 20 gf was applied to the optical fiber F by the tension-applying member 4 and the balance structure 7. The measurement wavelength was set to 1,625 nm as in the comparative example, and the transmitted power P1 was measured in the state shown in FIG. 6A and then the transmitted power P2 was measured in the state shown in FIG. 6B. When the transmitted power P2 was measured, the position detection unit 6 confirmed that the tension-applying member 4 was at a predetermined position. Namely, it was confirmed that the optical fiber F was properly wound around three mandrels 5. In Comparative Example 1 and Example 1-1, the bending conditions of the optical fiber F were substantially the same.

Also in Example 1, Δ was calculated by mathematical formula (1). When this measurement was performed 10 times and a standard deviation of the values of Δ was calculated, the standard deviation φ=0.56 dB.

Also in Examples 1-2 to 1-7, φ was calculated in the same procedure as that in Example 1-1. However, the position and the weight of the weight 7c were changed to adjust appropriately the tension as shown in Table 1.

As shown in Table 1, in each of Examples 1-1 to 1-7, the values of φ are significantly smaller than those in Comparative Example 1. The reason will be thoughtfully reviewed. In Comparative Example 1, since the optical fiber F is manually wound around the cylinder, the posture of winding of the optical fiber F around the cylinder is likely to vary. For example, the optical fiber F is likely to be wound around the On the other hand, in Examples 1-1 to 1-7, since the measurement device 10C is used, the optical fiber F can be stably bent. Therefore, it is considered that the variation of Δ is small and the value of φ is also small.

In Examples 1-1 to 1-7, there was no significant difference in the value of φ. Therefore, when the tension applied to the optical fiber F is 20 gf or less, the value of φ can be suppressed to be a small value. There is no data on the case where the tension is less than 1 gf, but when the tension is too small, it is considered that the loosening of the optical fiber F cannot be sufficiently removed.

Based on the above considerations, it can be said that the tension may be 20 gf or less and may also be 1 gf or more and 20 gf or less.

Figure 7:
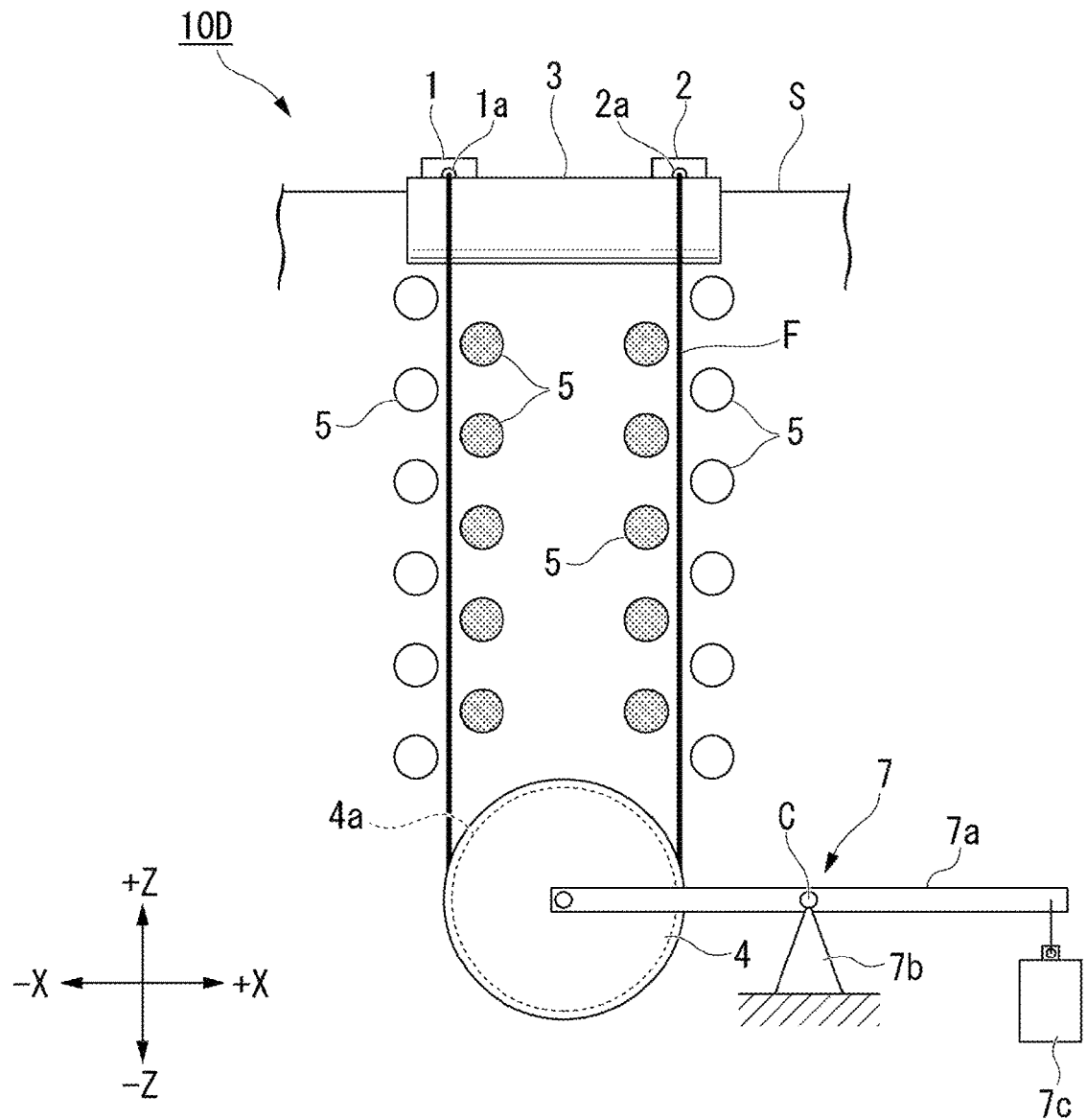
FIG. 7 is a view of a measurement device according to an example as viewed from the front.

Next, a measurement device 10D as shown in FIG. 7 was prepared. The measurement device 10D included the light source 1, the light-receiving portion 2, the direction-changing member 3, the tension-applying member 4, 22 mandrels 5, the position detection unit 6 (not shown), and the balance structure 7. 11 mandrels 5 were disposed to interpose the optical fiber F on the −X side therebetween, and the remaining 11 mandrels 5 were disposed to interpose the optical fiber F on the +X side therebetween. The diameter of the outer peripheral surface of each of the mandrels 5 was set to φ30 mm. The tension-applying member 4 included the groove 4a, and the diameter of the bottom surface of the groove 4a was φ280 mm.

Here, the same number of a plurality of the mandrels 5 were disposed on both sides in the left-right direction to interpose the tension-applying member 4 therebetween. Since the plurality of mandrels 5 are disposed in such a manner, a pass line of the optical fiber F can be compactly arranged and thus, measurement can be stably performed.

In the measurement device 10D, bending (equivalent to a radius of curvature of 15 mm×3,600°) to be measured was applied to the optical fiber F by the 22 mandrels 5. The bending of the optical fiber F by the tension-applying member 4 was not a measurement target since the radius of curvature is 140 mm. In addition, since the diameter of the direction-changing member 3 was also φ280 mm or more, the bending of the optical fiber F by the direction-changing member 3 was not a measurement target.

As shown in Table 2, the tension applied to the optical fiber F by the tension-applying member 4 was changed in a range of 1 gf to 20 gf. The tension was adjusted by changing the position and the weight of the weight 7c. Incidentally, in Comparative Example 2 and Examples 2-1 to 2-7 shown in Table 2, the measurement wavelength was set to 1,550 nm. Other points were the same as those in Table 1.

TABLE 2

|   | Comparative Example 2 | Example 2-1 | Example 2-2 | Example 2-3 | Example 2-4 | Example 2-5 | Example 2-6 | Example 2-7 |
|---|---|---|---|---|---|---|---|---|
| Bending method | Manual work | Measurement device 10D | Measurement device 10D | Measurement device 10D | Measurement device 10D | Measurement device 10D | Measurement device 10D | Measurement device 10D |
| Tension | — | 20 gf | 15 gf | 10 gf | 5 gf | 3 gf | 2 gf | 1 gf |
| σ | 0.021 dB | 0.008 dB | 0.006 dB | 0.009 dB | 0.006 dB | 0.007 dB | 0.005 dB | 0.008 dB |

As shown in Table 2, there was no significant difference in the value of φ in Examples 2-1 to 2-7. Similarly to the results in Examples 1-1 to 1-7, it can be said that the tension may be 20 gf or less and may also be 1 gf or more and 20 gf or less.

In addition, in Examples 2-1 to 2-7, the bending diameters are larger than those in Examples 1-1 to 1-7 and the values of a bending loss are smaller than those in Examples 1-1 to 1-7. In such a manner, even when the bending condition was changed, it could be confirmed that setting the tension in a range of 1 gf to 20 gf was effective.

(Measurement of Cutoff Wavelength by Bending Method)

In order to measure a cutoff wavelength in a bending condition in which the optical fiber F was wound one wrap around a cylinder of φ60 mm, similarly to the above-described bending loss measurement, the measurement device 10C shown in FIG. 6A was prepared. The measurement device 10C was the same as the measurement device 10C used for the bending loss measurement except that the diameter of the mandrel 5 was φ60 mm. As shown in Table 3, in Comparative Example 3 and Examples 3-1 to 3-7, the cutoff wavelength of the optical fiber F was measured 10 times under each condition. The cutoff wavelength was measured according to IEC 60793-1-44.

TABLE 3

|   | Comparative Example 3 | Example 3-1 | Example 3-2 | Example 3-3 | Example 3-4 | Example 3-5 | Example 3-6 | Example 3-7 |
|---|---|---|---|---|---|---|---|---|
| Bending method | Manual work | Measurement device 10C | Measurement device 10C | Measurement device 10C | Measurement device 10C | Measurement device 10C | Measurement device 10C | Measurement device 10C |
| Tension | — | 20 gf | 15 gf | 10 gf | 5 gf | 3 gf | 2 gf | 1 gf |
| σ | 5.3 nm | 2.6 nm | 2.1 nm | 1.8 nm | 1.7 nm | 2.1 nm | 1.6 nm | 1.9 nm |

In Comparative Example 3, the optical fiber F was bent by manually winding the optical fiber F one wrap around a cylinder of φ60 mm.

In Examples 3-1 to 3-7, the optical fiber F was bent using the measurement device 10C. In Comparative Example 3 and Examples 3-1 to 3-7, the bending conditions of the optical fiber F were substantially the same.

The column φ in Table 2 shows the values of a standard deviation of the cutoff wavelengths measured 10 times under each condition.

As shown in Table 3, in Examples 3-1 to 3-7, the values of the standard deviation φ could be more significantly reduced than those in Comparative Example 3.

Similarly to the results in Table 1, it was confirmed that the accuracy of measurement of the cutoff wavelength could be improved by using the measurement device 10C. Also, when the cutoff wavelength is measured, it can be said that the tension may be 20 gf or less and may also be 1 gf or more and 20 gf or less.

(Measurement of Cutoff Wavelength by Multi-Mode Method)

The cutoff wavelength was measured by a multi-mode method using the measurement device 10A shown in FIG. 1A. The measurement device 10A included the light source 1, the light-receiving portion 2, the direction-changing member 3, and the tension-applying member 4. A cylinder having a diameter of φ280 mm was used as the direction-changing member 3. The tension-applying member 4 included the groove 4a, and the diameter of the bottom surface of the groove 4a was φ280 mm.

As shown in Table 4, in Comparative Example 4 and Examples 4-1 to 4-7, the cutoff wavelength of the optical fiber F was measured 10 times under each condition by the multi-mode method.

The cutoff wavelength was measured by the multi-mode method as follows.

In Comparative Example 4, both ends of the optical fiber F were set in the light source 1 and the light-receiving portion 2, and the optical fiber F was bent by manually winding the optical fiber F one wrap around a mandrel of φ280 mm.

In Examples 4-1 to 4-7, bending was applied using the measurement device 10A. The optical fiber F was bent at φ280 mm×360° by the direction-changing member 3 and the tension-applying member 4, and other parts were not bent. Namely, in Comparative Example 4 and Examples 4-1 to 4-7, the bending conditions of the optical fiber F were substantially the same.

In both Comparative Example 4 and Examples 4-1 to 4-7, in a state where the optical fiber F was bent, light from the light source 1 was incident on the optical fiber F, and a transmitted power P1(λ) was measured by the light-receiving portion 2. Next, the optical fiber F was removed from the measurement device 10A, a multi-mode fiber was connected to the light source 1 and the light-receiving portion 2, and a light-receiving power P2(λ) of the light that had passed through the multi-mode fiber was measured. The cutoff wavelength by the multi-mode method was calculated using P1(λ) and P2(λ) according to IEC-60793-1-44.

TABLE 4

| | Comparative Example 4 | Example 4-1 | Example 4-2 | Example 4-3 | Example 4-4 | Example 4-5 | Example 4-6 | Example 4-7 |
|---|---|---|---|---|---|---|---|---|
| Bending method | Manual work | Measurement device 10A | Measurement device 10A | Measurement device 10A | Measurement device 10A | Measurement device 10A | Measurement device 10A | Measurement device 10A |
| Tension | — | 20 gf | 15 gf | 10 gf | 5 gf | 3 gf | 2 gf | 1 gf |
| σ | 4.8 nm | 2.5 nm | 1.6 nm | 2.3 nm | 2.8 nm | 2.0 nm | 2.3 nm | 2.1 nm |

As shown in Table 4, in Examples 4-1 to 4-7, the values of the standard deviation (φ) could be more significantly reduced than those in Comparative Example 4. In such a manner, it was confirmed that the accuracy of measurement of the cutoff wavelength using the multi-mode method could be improved by using the measurement device 10D. In addition, also when the cutoff wavelength is measured using the multi-mode method, it can be said that the tension may be 20 gf or less and may also be 1 gf or more and 20 gf or less.

(Measurement of Cutoff Wavelength by Bending Method)

Figure 8A:
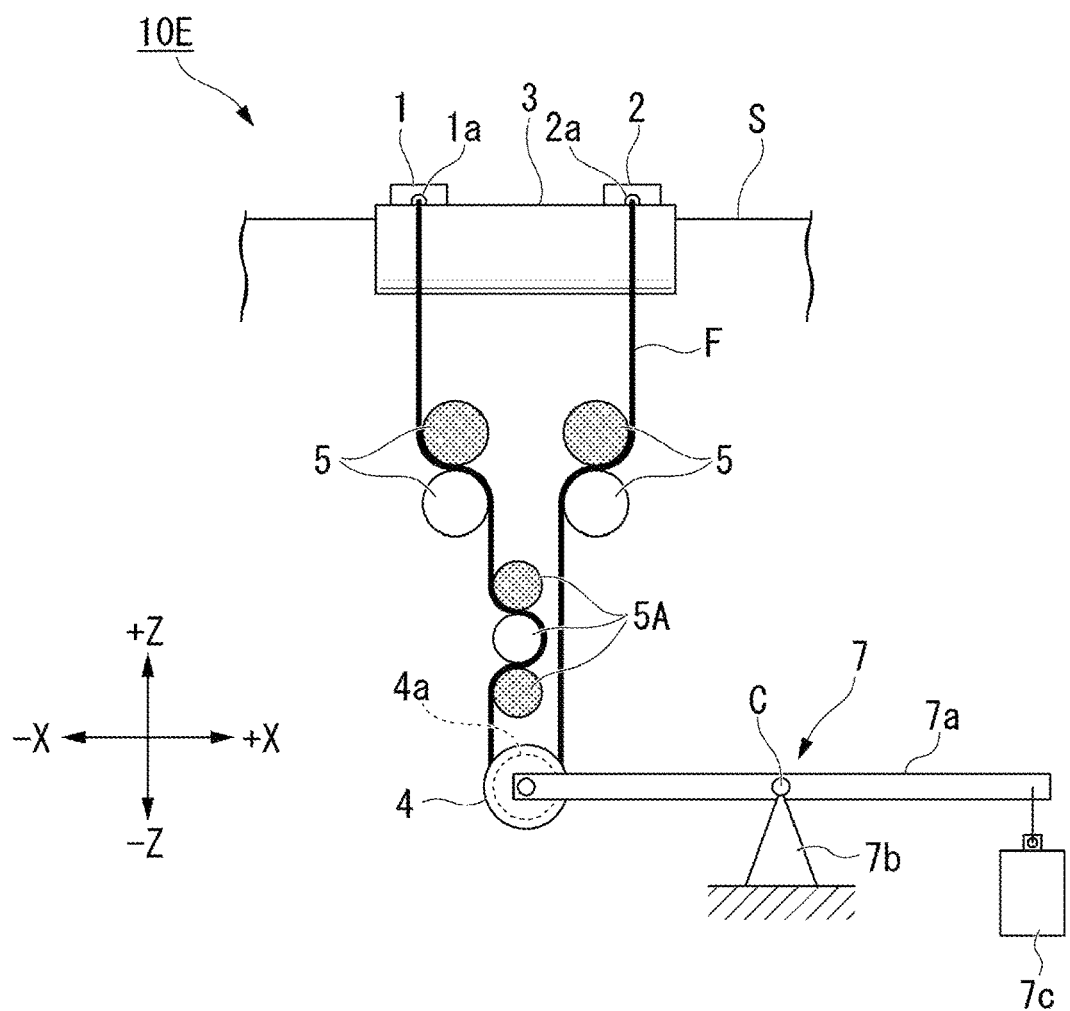
FIG. 8A is a view of a measurement device according to an example as viewed from the front.

Next, the bending condition was changed, and the cutoff wavelength by the bending method was measured using a measurement device 10E shown in FIG. 8A. The measurement device 10E included the light source 1, the light-receiving portion 2, the direction-changing member 3, the tension-applying member 4, four mandrels 5, three mandrels 5A, the position detection unit 6 (not shown), and the balance structure 7. A cylinder having a diameter of φ80 mm was used as the direction-changing member 3. The diameter of the outer peripheral surface of each of the four mandrels 5 was set to φ80 mm. The diameter of the outer peripheral surface of each of the three mandrels 5A was set to φ60 mm. The tension-applying member 4 included the groove 4a, and the diameter of the bottom surface of the groove 4a was φ80 mm.

Here, regarding the four mandrels 5, the same number of the mandrels 5 were disposed on both sides in the left-right direction to interpose the tension-applying member 4 therebetween, and the three mandrels 5A were disposed only on the left side. In such a manner, when at least one mandrel 5 disposed on the left side of the tension-applying member 4 and at least one mandrel 5 disposed on the right side of the tension-applying member 4 in the left-right direction are provided, the dimension of the optical fiber measurement device in the up-down direction can be shortened.

Figure 8B:
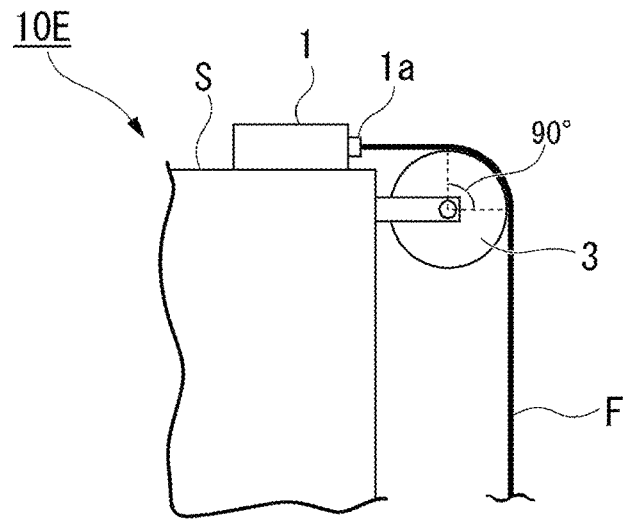
FIG. 8B is a view of the measurement device of FIG. 8A as viewed from the left.

According to the measurement device 10E, bending to be measured was applied to the optical fiber F by the direction-changing member 3, the tension-applying member 4, and the four mandrels 5. The positions of the emitting side connection portion 1a and the incident side connection portion 2a in the up-down direction coincided with the position of an upper end of the direction-changing member 3. For this reason, each of parts of the optical fiber F along the direction-changing member 3 was bent at a radius of curvature of 40 mm×90° (refer to FIG. 8B). The optical fiber F was bent at two places by the direction-changing member 3. Therefore, the bending of the optical fiber F by the direction-changing member 3 corresponded to a radius of curvature of 40 mm×180°.

Each of the four mandrels 5 bent the optical fiber F at a radius of curvature of 40 mm×90°. In addition, the tension-applying member 4 bent the optical fiber F at a radius of curvature of 40 mm×180°. The three mandrels 5A bent the optical fiber F at a radius of curvature of 30 mm×(90°+180°+90°).

Summing up the above, the measurement device 10E bent the optical fiber F at a radius of curvature equivalent to 40 mm×720° (two wraps) and at a radius of curvature equivalent to 30 mm×360° (one wrap).

As shown in Table 5, in Comparative Example 5 and Examples 5-1 to 5-7, the cutoff wavelength of the optical fiber F was calculated 10 times under each condition using the bending method. The cutoff wavelength was calculated using transmitted powers before and after bending equivalent to a radius of curvature of 40 mm×720° was performed by the mandrels 5 of the measurement device 10E and bending equivalent to a radius of curvature of 30 mm×360° (one wrap) was performed by the mandrels 5A under the bending condition.

TABLE 5

| | Comparative Example 5 | Example 5-1 | Example 5-2 | Example 5-3 | Example 5-4 | Example 5-5 | Example 5-6 | Example 5-7 |
|---|---|---|---|---|---|---|---|---|
| Bending method | Manual work | Measurement device 10E | Measurement device 10E | Measurement device 10E | Measurement device 10E | Measurement device 10E | Measurement device 10E | Measurement device 10E |
| Tension | — | 20 gf | 15 gf | 10 gf | 5 gf | 3 gf | 2 gf | 1 gf |
| σ | 6.1 nm | 2.8 nm | 2.0 nm | 1.5 nm | 2.0 nm | 2.1 nm | 1.5 nm | 2.2 nm |

In Comparative Example 5, the optical fiber F was bent by manually winding the optical fiber F around a cylinder of φ80 mm two wraps. The transmitted power P1 was measured in that state. Next, in addition to the state where the optical fiber F was wound two wraps around a cylinder of φ80 mm, the optical fiber F was bent one wrap around a cylinder of φ60 mm. The transmitted power P2 was measured in that state. The cutoff wavelength was measured using P1 and P2 obtained in such a manner.

In Examples 5-1 to 5-7, the optical fiber F was bent using the measurement device 10E. Specifically, the transmitted power P1 was measured in a state where the optical fiber F was bent at a radius of curvature equivalent to 40 mm×720° by the mandrels 5. Next, the transmitted power P2 was measured in a state where the optical fiber F was bent at a radius of curvature equivalent to 30 mm×360° by the mandrels 5A in addition to being bent by the mandrels 5. The cutoff wavelength was measured using P1 and P2 obtained in such a manner.

In Comparative Example 5 and Examples 5-1 to 5-7, the bending conditions of the optical fiber F were substantially the same.

The column σ in Table 5 shows the values of a standard deviation of the cutoff wavelengths measured 10 times under each condition.

As shown in Table 5, in Examples 5-1 to 5-7, the values of the standard deviation σ could be more significantly reduced than those in Comparative Example 5.

In such a manner, it was confirmed that the accuracy of measurement of the cutoff wavelength could be improved by using the measurement device 10E. In addition, also when the bending condition is changed and the cutoff wavelength is measured, it can be said that the tension may be 20 gf or less and may also be 1 gf or more and 20 gf or less.
(Measurement of Mode Field Diameter)

In order to measure a mode field diameter under a bending condition in which the optical fiber F was wound one wrap around a cylinder of φ60 mm, similarly to the above-described bending loss measurement, the measurement device 10C shown in FIG. 6A was prepared. The measurement device 10C was the same as the measurement device 10C used for the bending loss measurement except that the diameter of the mandrel 5 was φ60 mm. As shown in Table 6, in Comparative Example 6 and Examples 6-1 to 6-7, the mode field diameter was measured 10 times under each condition. The mode field diameter was measured according to IEC 60793-1-45.

sured, the measurement devices 10A to 10E of the present embodiment or the bending method of the present embodiment can also be adopted. When the characteristic requires the bending of the optical fiber F during measurement, the accuracy of measurement can be improved by applying the present embodiment.

In addition, the disposition of the mandrels 5 is not limited to the examples of the measurement devices 10B to 10E, and can be appropriately changed.

In addition, the emitting side connection portion 1a and the incident side connection portion 2a may not necessarily face forward (+Y side). For example, the emitting side connection portion 1a and the incident side connection portion 2a may face upward or backward. Alternatively, the emitting side connection portion 1a may face leftward, and the incident side connection portion 2a may face rightward. In these cases, an optical path (optical fiber, optical waveguide, or the like) may be connected to each of the emitting side connection portion 1a and the incident side connection portion 2a, and ends of the optical path may be disposed at the positions of the emitting side connection portion 1a and the incident side connection portion 2a shown in FIG. 1A and the like. Then, in the case of a configuration in which both end parts of the optical fiber F are connected to the ends of the optical path and the extending direction of the optical fiber F is changed downward by the direction-changing member 3, the same effects as those in the above embodiments can be obtained. Even in these cases, there is no

TABLE 6

| | Comparative Example 6 | Example 6-1 | Example 6-2 | Example 6-3 | Example 6-4 | Example 6-5 | Example 6-6 | Example 6-7 |
|---|---|---|---|---|---|---|---|---|
| Bending method | Manual work | Measurement device 10C | Measurement device 10C | Measurement device 10C | Measurement device 10C | Measurement device 10C | Measurement device 10C | Measurement device 10C |
| Tension | — | 20 gf | 15 gf | 10 gf | 5 gf | 3 gf | 2 gf | 1 gf |
| σ | 0.032 μm | 0.012 μm | 0.013 μm | 0.009 μm | 0.010 μm | 0.008 μm | 0.011 μm | 0.010 μm |

In Comparative Example 6, the optical fiber F was bent by manually winding the optical fiber F one wrap around a cylinder of φ60 mm.

In Examples 6-1 to 6-7, the optical fiber F was bent using the measurement device 10C. In Comparative Example 6 and Examples 6-1 to 6-7, the bending conditions of the optical fiber F were substantially the same.

The column ≐ in Table 6 shows the values of a standard deviation of the mode field diameter measured 10 times under each condition.

As shown in Table 6, in Examples 6-1 to 6-7, the values of the standard deviation σ could be more significantly reduced than those in Comparative Example 6.

In such a manner, it was confirmed that the accuracy of measurement of the mode field diameter could be improved by using the measurement device 10C. In addition, also when the mode field diameter is measured, it can be said that the tension may be 20 gf or less and may also be 1 gf or more and 20 gf or less.

Incidentally, the technical scope of the present invention is not limited to the above embodiments, and various modifications can be made without departing from the spirit of the present invention.

For example, in the above examples, the bending loss, the cutoff wavelength, and the mode field diameter have been provided as an example of the characteristic to be measured of the optical fiber F. However, when a characteristic of the optical fiber F other than the above characteristics is meadifference in that the direction-changing member 3 changes the extending direction of the optical fiber F downward, both end part of the optical fiber F being optically connected to the light source 1 and the light-receiving portion 2.

In addition, a distance in the left-right direction between the emitting side connection portion 1a and the incident side connection portion 2a or a distance in the left-right direction between the ends of the optical path which are connected to the emitting side connection portion 1a and the incident side connection portion 2a may be adjusted such that the optical fiber F is not obliquely wound around the direction-changing member 3. For example, in FIG. 1A, the distance in the left-right direction between the emitting side connection portion 1a and the incident side connection portion 2a may be equal to the diameter of the bottom surface of the groove 4a of the tension-applying member 4.

In addition, the positions of the emitting side connection portion 1a and the incident side connection portion 2a in the up-down direction may be different from each other.

In addition, the components in the above-described embodiments can be appropriately replaced with known components without departing from the concept of the present invention, and the embodiments or the modification examples described above may be appropriately combined.

For example, the mandrel 5 having the shapes shown in FIGS. 3A to 3C may be adopted as the mandrels 5 and 5A of the measurement devices 10B to 10E.

In addition, the spring 4b shown in FIG. 1D may be applied to the measurement devices 10B to 10E.

In addition, in the measurement devices 10B to 10E, the spring 4b may be used instead of the balance structure 7. Alternatively, in the measurement devices 10B to 10E, a tension may be applied to the optical fiber F by merely the weight of the tension-applying member 4 instead of using the spring 4b or the balance structure 7.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Light source
2: Light-receiving portion
3: Direction-changing member
4: Tension-applying member
4a: Groove
5, 5A: Mandrel
5a: Groove (mandrel groove)
6: Position detection unit
10A to 10E: Measurement device
F: Optical fiber

What is claimed is:

1. An optical fiber measurement device comprising:
a light source that emits light toward an optical fiber;
a detector that receives the light that has propagated through the optical fiber;
a direction-changing member, on which the optical fiber is hung, that changes an extending direction of the optical fiber to extend downward, the optical fiber being optically connected to the light source and the detector at each of two end parts of the optical fiber;
a tension-applying member that applies a tension to the optical fiber hanging from the direction-changing member;
mandrels that bend the optical fiber, wherein
the mandrels are disposed between the direction-changing member and the tension-applying member, and
one or more of the mandrels is movable obliquely with respect to a left-right direction in which the mandrels face each other with the optical fiber disposed between the mandrels, as viewed in an up-down direction.

2. The optical fiber measurement device according to claim 1, wherein the tension applying member has a groove that regulates a position of the optical fiber.

3. The optical fiber measurement device according to claim 1,
wherein one or more of the mandrels has a mandrel groove that regulates a position of the optical fiber.

4. The optical fiber measurement device according to claim 3, wherein
the tension applying member has a groove that regulates a position of the optical fiber, and
a position of the groove and a position of the mandrel groove coincide, in a front-back direction, where the front-back direction is orthogonal to both the up-down direction and the left-right direction.

5. The optical fiber measurement device according to claim 1, further comprising:
a position detector that detects a position of the tension-applying member in the up-down direction.

6. The optical fiber measurement device according to claim 1,
wherein the tension applied to the optical fiber by the tension-applying member is 20 gf or less.

7. The optical fiber measurement device according to claim 1,
wherein the mandrels include:
a mandrel that bends the optical fiber at an angle of 90°; and
a mandrel that bends the optical fiber at an angle of 180°.

8. A method for bending an optical fiber, the method comprising:
hanging the optical fiber on a direction-changing member, both end parts of the optical fiber being fixed;
applying a tension to the optical fiber hanging from the direction-changing member using a tension-applying member; and
bending the optical fiber using mandrels disposed between the direction-changing member and the tension-applying member, wherein
one or more of the mandrels is movable obliquely with respect to a left-right direction in which the mandrels face each other with the optical fiber disposed between the mandrels, as viewed in an up-down direction.

9. An optical fiber measurement device comprising:
a light source that emits light toward an optical fiber;
a detector that receives the light that has propagated through the optical fiber;
a direction-changing member, on which the optical fiber is hung, that changes an extending direction of the optical fiber to extend downward, the optical fiber being optically connected to the light source and the detector at each of two end parts of the optical fiber;
a tension-applying member that applies a tension to the optical fiber hanging from the direction-changing member; and
mandrels that bend the optical fiber, wherein
the mandrels are disposed between the direction-changing member and the tension-applying member, and
the mandrels include:
at least one mandrel disposed on a left side of the tension-applying member in a left-right direction in which the mandrels face each other with the optical fiber disposed between the mandrels, as viewed in an up-down direction; and
at least one mandrel disposed on a right side of the tension-applying member in the left-right direction.

10. The optical fiber measurement device according to claim 9, wherein
the tension applying member has a groove that regulates a position of the optical fiber.

11. The optical fiber measurement device according to claim 9,
wherein one or more of the mandrels has a mandrel groove that regulates a position of the optical fiber.

12. The optical fiber measurement device according to claim 11, wherein
the tension applying member has a groove that regulates a position of the optical fiber, and a position of the groove and a position of the mandrel groove coincide, in a front-back direction, where the front-back direction is orthogonal to both the up-down direction and the left-right direction.

13. The optical fiber measurement device according to claim 9, further comprising:
a position detector that detects a position of the tension-applying member in the up-down direction.

14. The optical fiber measurement device according to claim 9,
wherein the tension applied to the optical fiber by the tension-applying member is 20 gf or less.

15. The optical fiber measurement device according to claim 9,
wherein the mandrels include:
a mandrel that bends the optical fiber at an angle of 90°; and
a mandrel that bends the optical fiber at an angle of 180°.

16. A method for bending an optical fiber, the method comprising:
hanging the optical fiber on a direction-changing member, both end parts of the optical fiber being fixed;
applying a tension to the optical fiber hanging from the direction-changing member using a tension-applying member; and
bending the optical fiber using mandrels disposed between the direction-changing member and the tension-applying member, wherein
the mandrels include:
at least one mandrel disposed on a left side of the tension-applying member in a left-right direction in which the mandrels face each other with the optical fiber disposed between the mandrels, as viewed in an up-down direction; and
at least one mandrel disposed on a right side of the tension-applying member in the left-right direction.

* * * * *